US008490078B2

(12) United States Patent
Dennis et al.

(10) Patent No.: US 8,490,078 B2
(45) Date of Patent: Jul. 16, 2013

(54) SYSTEM AND METHOD FOR APPLICATION MANAGEMENT

(75) Inventors: Richard P. Dennis, Fair Lawn, NJ (US); Rodney Nolan Brown, Humble, TX (US)

(73) Assignee: Barclays Capital, Inc., New York, NY (US)

( * ) Notice: Subject to any disclaimer, the term of this patent is extended or adjusted under 35 U.S.C. 154(b) by 1202 days.

(21) Appl. No.: 11/902,791

(22) Filed: Sep. 25, 2007

(65) Prior Publication Data

US 2009/0083728 A1 Mar. 26, 2009

(51) Int. Cl.
*G06F 9/445* (2006.01)

(52) U.S. Cl.
USPC ............ 717/174; 717/175; 717/178

(58) Field of Classification Search
None
See application file for complete search history.

(56) References Cited

U.S. PATENT DOCUMENTS

| | | | |
|---|---|---|---|
| 6,880,107 B1 * | 4/2005 | Kraft, IV | 714/36 |
| 6,990,660 B2 * | 1/2006 | Moshir et al. | 717/171 |
| 7,117,371 B1 * | 10/2006 | Parthasarathy et al. | 717/178 |
| 7,155,713 B1 * | 12/2006 | Burkhardt et al. | 717/175 |
| 7,398,524 B2 * | 7/2008 | Shapiro | 717/175 |
| 7,487,169 B2 * | 2/2009 | Agarwal | 1/1 |
| 7,562,346 B2 * | 7/2009 | Jhanwar et al. | 717/175 |
| 7,657,887 B2 * | 2/2010 | Kothandaraman et al. | 717/174 |
| 7,712,094 B2 * | 5/2010 | Shapiro | 717/175 |
| 7,827,147 B1 * | 11/2010 | D'Hoye et al. | 707/652 |
| 8,245,221 B2 * | 8/2012 | Czeisler et al. | 717/174 |
| 8,266,615 B2 * | 9/2012 | Shapiro | 717/174 |
| 8,301,874 B1 * | 10/2012 | Heidingsfeld et al. | 717/178 |
| 8,321,859 B2 * | 11/2012 | Shapiro | 717/175 |
| 2004/0199572 A1 | 10/2004 | Hunt et al. | |
| 2005/0257265 A1 | 11/2005 | Cook | |
| 2005/0283623 A1 * | 12/2005 | Vanderheyden et al. | 713/193 |
| 2006/0085860 A1 | 4/2006 | Zou | |
| 2006/0130046 A1 | 6/2006 | O'Neill | |
| 2006/0168183 A1 * | 7/2006 | Fuller et al. | 717/120 |
| 2007/0022420 A1 | 1/2007 | Yamamoto | |
| 2007/0150886 A1 * | 6/2007 | Shapiro | 717/174 |
| 2007/0150887 A1 * | 6/2007 | Shapiro | 717/174 |
| 2007/0174921 A1 | 7/2007 | England et al. | |
| 2011/0113424 A1 * | 5/2011 | Ewington et al. | 717/178 |

FOREIGN PATENT DOCUMENTS

| EP | 1361509 | 11/2003 |
|---|---|---|
| EP | 1462999 | 9/2004 |

OTHER PUBLICATIONS

Biggers, et al., "Using ThinkVantage Technologies: vol. 1 Creating and Deploying Client Systems"; 2005, IBM; [retrieved on Mar. 7, 2013]; Retrieved from Internet <URL:http://ip.com/pdf/readbook/SG24710600.pdf>;pp. 1-448.*

(Continued)

*Primary Examiner* — Thuy Dao
*Assistant Examiner* — Xi D Chen
(74) *Attorney, Agent, or Firm* — Morgan Lewis & Bockius LLP

(57) ABSTRACT

A system includes at least one developer device to create and/or modify at least one computer application to be deployed to an end device, the computer application defined by a manifest, the manifest including (a) at least one file fingerprint unique to a computer file associated with the computer application, and (b) metadata of the computer file, and at least one dispatch server to manage deployment/undeployment of the computer application.

21 Claims, 8 Drawing Sheets

OTHER PUBLICATIONS

Biggers, et al., "Using ThinkVantage Technologies: vol. 2 Maintaining and Recovering Client Systems"; 2006, IBM; [retrieved on Mar. 7, 2013]; Retrieved from Internet <URL:http://ip.com/pdf/readbook/SG24710700.pdf>;pp. 1-448.*

Meister, Brinkmann, "Multi-Level Comparison of Data Duplicaiton in a Backup Scenario", 2009, Systor'09; [retrieved on Mar. 7, 2013]; Retrieved from Internet <URL:http://dl.acm.org/results.cfm?CFID=187999418>;pp. 1-12.*

Wood, et al., "CloudNet: Dynamic Pooling of Cloud Resources by Live WAN Migration of Virtual Machines", 2011, ACM; [retrieved on Mar. 7, 2013]; Retrieved from Internet <URL:http://dl.acm.org/citation.cfm?id=1952682>;pp. 121-132.*

European Search Report dated Dec. 23, 2010 for European Application No. 08742439.6.

Opsware, retrieved from Internet <URL: www.opsware.com>, accessed on Dec. 26, 2007.

Bladelogic, retrieved from Internet <URL: www.bladelogic.com>, accessed on Dec. 26, 2007.

Git, retrieved from Internet <URL: www.git.or.cz.com>, accessed on Dec. 26, 2007.

* cited by examiner

- Sample manifest entry:

```
Application:Application1
Appversion:1.0
Instance:ins_appsstage
Component:TestScripts
Compversion:2.3
|------oid (sha1sum)------|------src------|--user--|-group--|perm|type|size-|-----dst------
|da39a3ee5e6b4b0d3255bfef95601890afd80709|/home/sysadmin/foo|sysadmin|linuxeng| 750|   1|16384|/local/0/app/foo..
```

FIG. 4

Example "find <repository> -type f":
- ...
- <repository>/9a/9ade2c09beb9fdf9f4670f3840a16e5fc7483fd2
- <repository>/49/49cef82767c802a2768f65d21a09d510f0c1183b
- <repository>/40/40bbaf63ea8e291b65e7d8f6ec7ff6b49ded9b28
- <repository>/d4/d4aa98202f8a13ba0b6f93fbf866ce9c2b85aaa7
- <repository>/86/86ffb9e7086526b18e9a1644lece7354018l4ebc
- <repository>/e1/e13d8abbd78a6857424560d5a8862cb9617338b1
- <repository>/32/3259da0d9bf07adbd0779d1ec0006285ac0995cc
- <repository>/f6/f61095a58c8e0429a1cd0bff482a6c352f30cddb
- <repository>/c7/c73a0f99192adc3ecf63f9e2532d732e4d043c4b
- <repository>/05/05eb803c6ba5f4584f3cdcd234l608addfcc5f06
- <repository>/7b/7b6cc361740555c74e1a695a83091da5ef1b1301
- <repository>/62/621e4ef4bc2fdd273a5880a66605e61ec4505830
- ...

FIG. 5

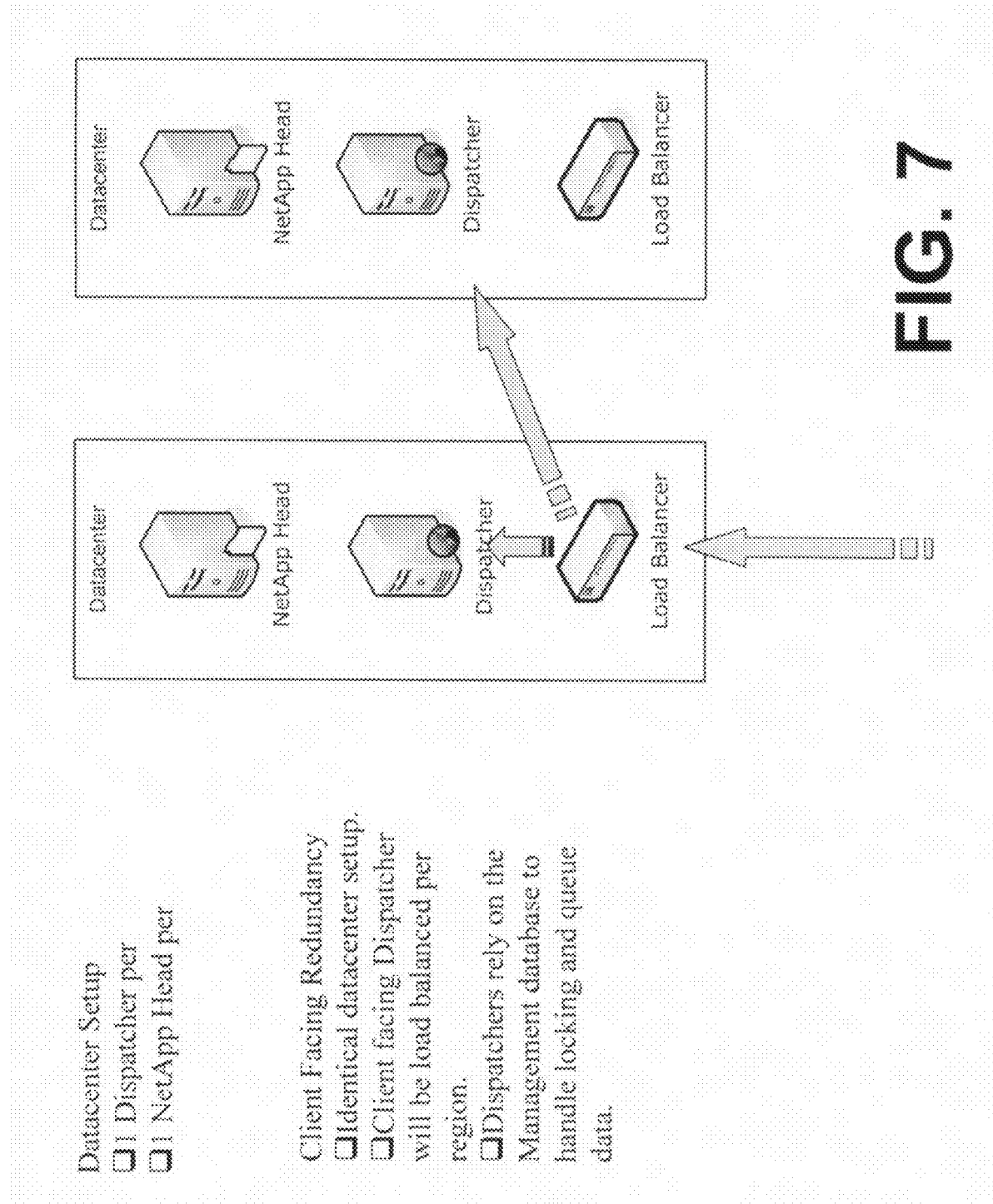

SYSTEM AND METHOD FOR APPLICATION MANAGEMENT

BACKGROUND OF THE INVENTION

1. Field of the Invention

The present invention relates to a system and method for application management, and more particularly to a system and method for managing applications for deployment over a network.

2. Discussion of the Related Art

Typically, an application deployment tool is used to deploy (i.e., install/uninstall) application packages to servers in a computing environment. These deployment tools generally require that the applications for deployment are packaged in a format supported by the deployment tool. The deployment tool then manages the association of the package-to-application and application-to-server. These application "packages" are generally a compilation of the application, its supporting files, and metadata that describes the package and the files therein. As developers package their applications, they generally end up making modifications to the files. However, in order to incorporate the changes, the package must be completely rebuilt even though some of the files may not have changed. Accordingly, the developers' packages may take up enormous amount of storage space with most of the space being taken up by unnecessary redundant files, thereby wasting storage space. Moreover, during deployment and install/reinstallation procedures, all of the files in the application package are uploaded even though only a few files in the application package have changed. Furthermore, typical deployment tools rely on package databases having to be local to each server to store the data on which the packages have been installed. Accordingly, this dependence prevents the deployment of the applications in the packages to virtual servers in clustered environments, such as Network Filesystem Servers ("NFS").

SUMMARY OF THE INVENTION

Accordingly, the present invention is directed to a system and method that substantially obviates one or more problems due to limitations and disadvantages of the related art.

An object of the present invention is to provide a system and method for managing applications to be deployed efficiently.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system includes at least one developer device to create and/or modify at least one computer application to be deployed to an end device, the computer application defined by a manifest, the manifest including at least one file fingerprint unique to a computer file associated with the computer application, and metadata of the computer file, and at least one dispatch server to manage deployment/undeployment of the computer application.

In another aspect, a method includes the steps of creating a manifest to define a computer application, the manifest including at least one file fingerprint unique to a computer file associated with the computer application and metadata of the computer file, checking for duplicates of the computer file by determining whether the computer file associated with the file fingerprint included in the manifest exists, and managing the computer application such that if the file fingerprint is not detected, including the computer file associated with file fingerprint for deployment, or if the file fingerprint is detected, not including the computer file associated with the file fingerprint for deployment.

In yet another aspect, a computer program product includes a computer readable medium having stored thereon computer executable instructions that, when executed on a computer, configures the computer to perform a method comprising the steps of creating a manifest to define a computer application, the manifest including at least one file fingerprint unique to a computer file associated with the computer application and metadata of the computer file, checking for duplicates of the computer file by determining whether the computer file associated with the file fingerprint included in the manifest exists, and managing the computer application such that if the file fingerprint is not detected, including the computer file associated with file fingerprint for deployment, or if the file fingerprint is detected, not including the computer file associated with the file fingerprint for deployment.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 4 illustrates an exemplary manifest entry in accordance with the present invention;

FIG. 5 illustrates an exemplary file directory structure in accordance with the present invention;

FIG. 7 illustrates a block diagram of an exemplary embodiment of a management interface module in accordance with the present invention.

DETAILED DESCRIPTION OF THE PREFERRED EMBODIMENTS

Reference will now be made in detail to the preferred embodiments of the present invention, examples of which are illustrated in the accompanying drawings.

The application management system and method in accordance with the present invention is directed to management of the deployment of applications to servers in a computing environment. In particular, an exemplary embodiment of the present invention is aimed at providing a solution to deploy applications to virtual servers in clustered environments, such as NFS servers. More specifically, the system and method in accordance with the present invention provides a framework around a central database in order to intelligently manage the actions and associations related to application installs/uninstalls (i.e., deployment). While the exemplary embodiment is directed to the deployment of applications to servers, the deployment may be directed to other computing devices (e.g., to client devices) without departing from the scope of the invention. Accordingly, the specific embodiments set forth in the description below are to be construed as examples and not necessarily as limitations.

Figure 1:
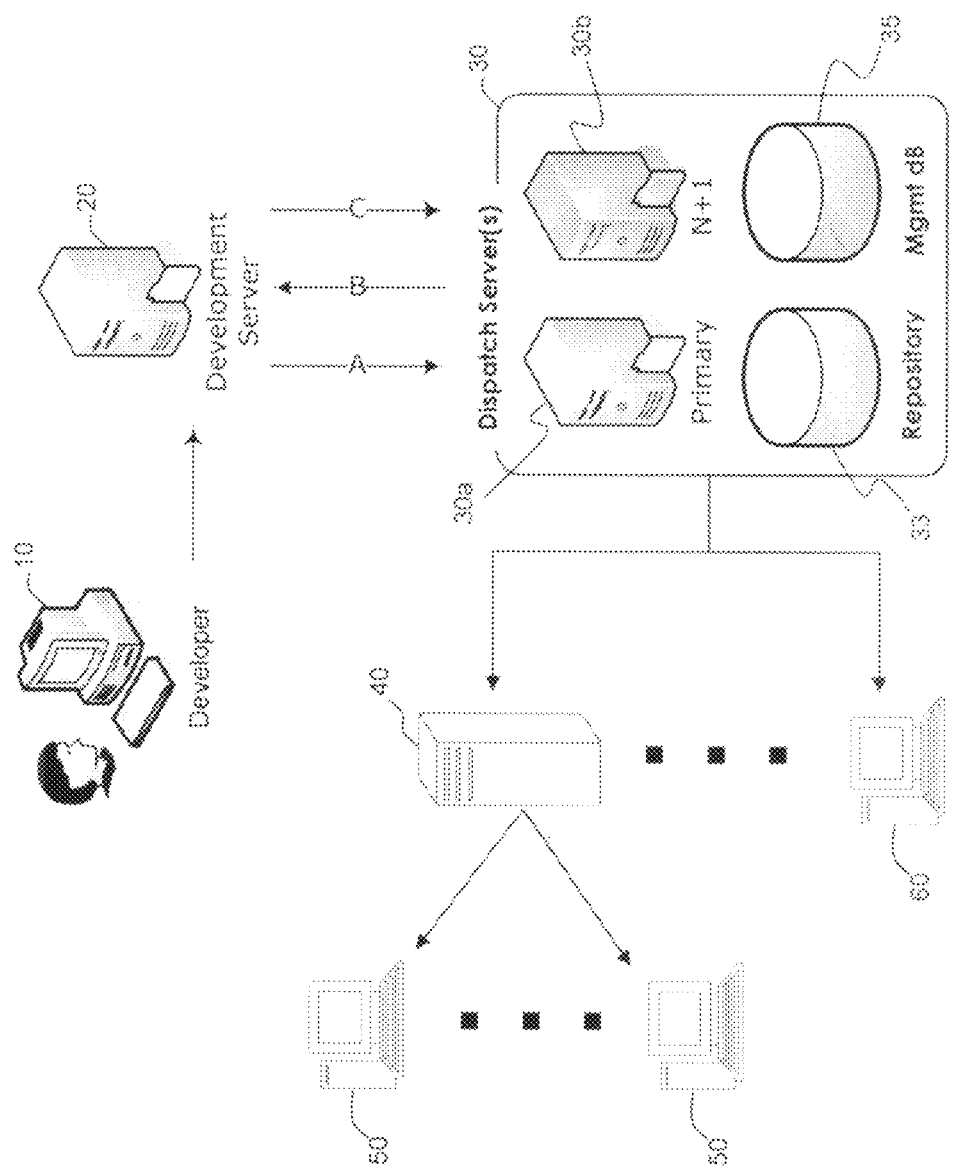
FIG. 1 illustrates a block diagram of an exemplary embodiment of the present invention.

FIG. 1 shows a network diagram illustrating a system for an application management framework in accordance with an exemplary embodiment of the present invention. As shown in FIG. 1, the exemplary system according to the present invention includes an application developer workstation 10, development server 20, dispatch server 30, production server 40, and client device 50. As a general overview of the exemplary embodiment of the present invention, application developer workstation 10 is used by an application developer to create and/or modify software applications to be run on the production server 40 or the client device 50. The application developer workstation 10 may be a stand-alone device or connected to the development server 20 in a client-server configuration. To dispatch the developed application to the end devices (i.e., production server 40 or client device 50), the developed application is packaged and uploaded to a dispatch server 30. The dispatch server 30 then dispatches (i.e., installs/uninstalls) the applications to the end devices (i.e., production server 40 or client device 50). It is to be understood that any number of developer workstations 10, development server 20, dispatch servers 30, production servers 50, and client devices 50 may be included in the framework according to the present invention without departing from the scope of the present invention. The details of the framework in accordance with the exemplary embodiment of the present invention are described below.

The application developer workstation 10 is used by application developers to create new applications or modify existing applications. As briefly described above, an application generally includes multiple files associated with the application as well as metadata that describe each of the files associated with the application. In the exemplary embodiment shown in FIG. 1, the application developer workstation 10 is connected to development server 20. The applications are created and/or modified and stored on the development server 20 during the development process. Alternatively, the application developer workstation 10 may be a stand-alone device where the developed application resides on the application developer workstation 10. In either instance, once an application has been developed, the developed application is uploaded to the dispatch server 30.

Dispatch server 30 includes file repository 33 and management database 35. As show in FIG. 1, the dispatch server 30 in accordance with the exemplary embodiment of the present invention includes primary dispatch server 30a and secondary dispatch servers 30b. However, any number of dispatch servers may be used without departing from the scope of the present invention. In accordance with the present invention, the dispatch server 30 stores metadata of the developed application separately from the files associated with the application. Furthermore, as will be described in more detail below, only the files that have been modified are actually stored in the file repository 33, thereby reducing the number of redundant files stored in the file repository 33 to use the storage space more efficiently.

Figure 2:
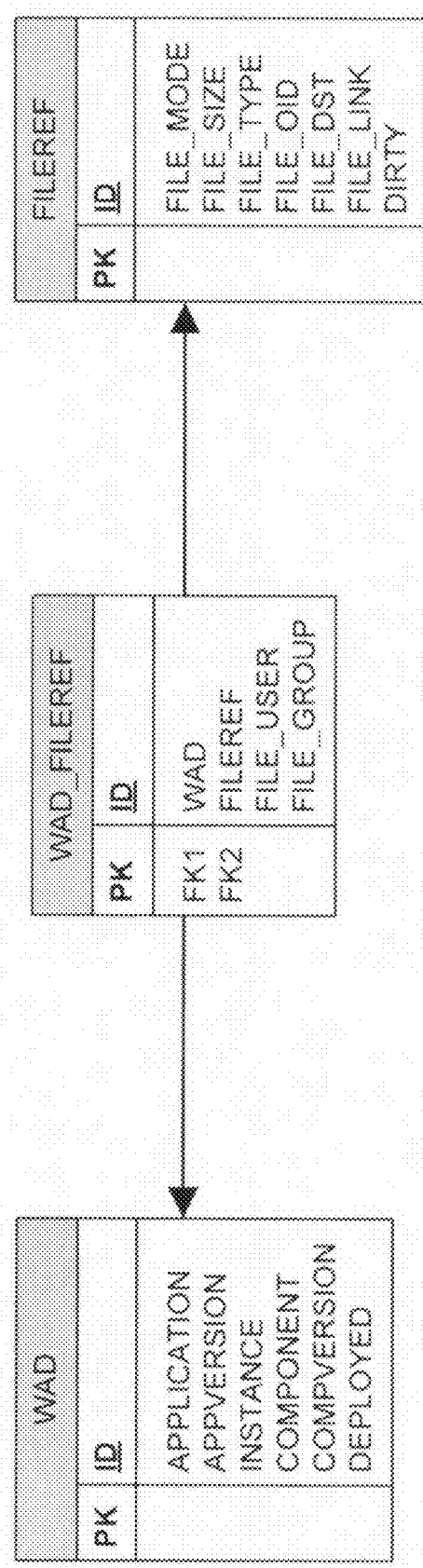
FIGS. 2 and 3 illustrate exemplary database structures in accordance with the present invention.

The application uploading process of developed applications will now be described in more detail. Because an application includes multiple files and metadata associated thereto, the application is "packaged" to be uploaded to the dispatch server 30. An application package includes a manifest that lists all the files that are associated with the developed application. As shown in FIG. 1, a developer initiates an application upload, which triggers the development server 20 to compile an upload manifest and send the manifest to the dispatch server 30. (Step A) In particular, the upload manifest includes a list of the files associated with the application, their metadata, and a unique file "fingerprint" for each of the files listed in the manifest. The file fingerprint is defined by <sha1sum> value of the file to create a unique fingerprint. To increase the uniqueness of the file fingerprint, <filesize> value of the file may be added to the <sha1sum> value; FIG. 2 illustrates an exemplary entry of an upload manifest and should be construed as an example only.

Figure 3:
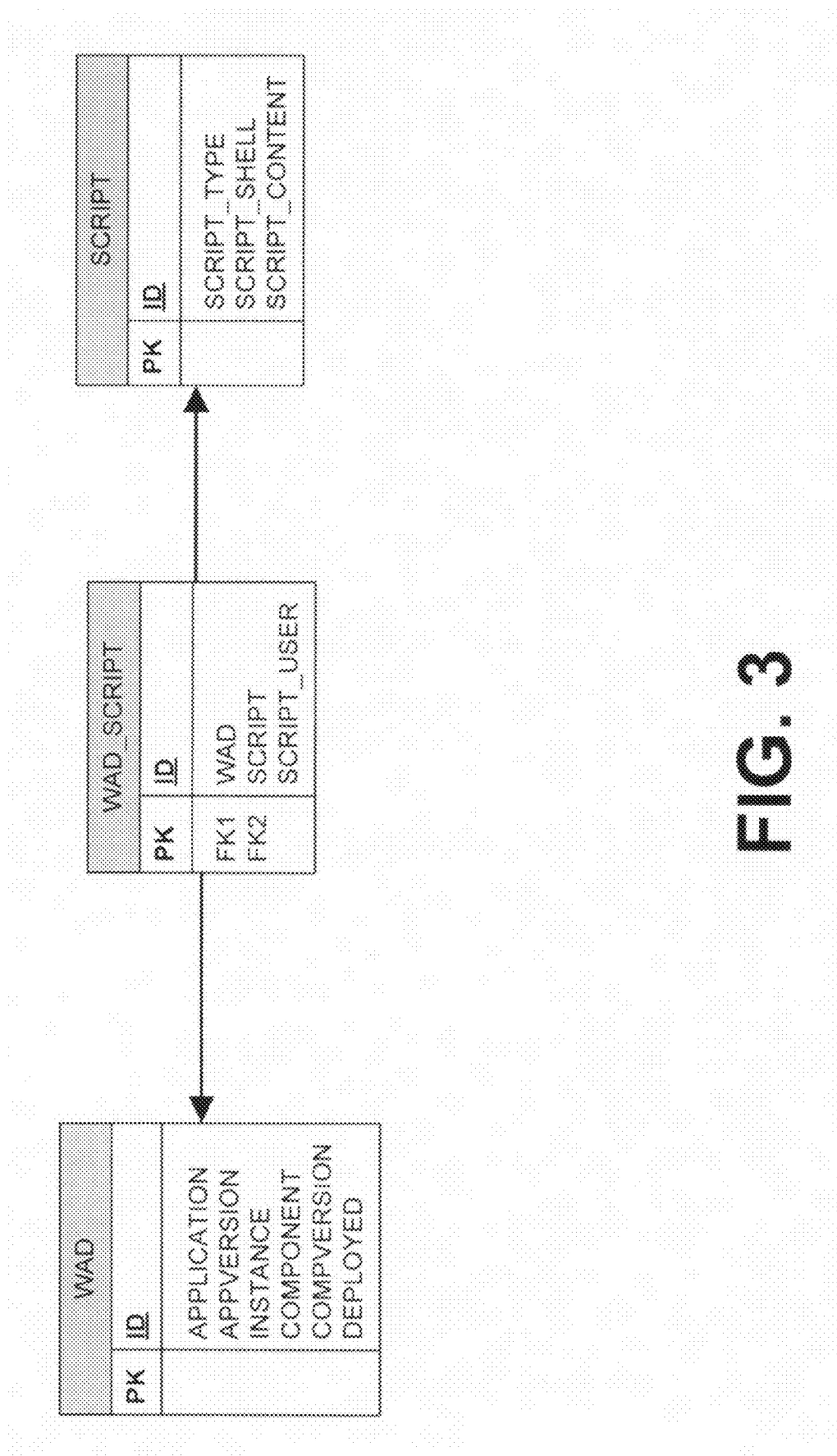

Once the dispatch server 30 receives the upload manifest, the dispatch server 30 adds the metadata included in the manifest to the management database 35. As shown in FIGS. 2 and 3, in accordance with the exemplary embodiment of the present invention, metadata with references to files are associated with the application by joining a table (e.g., "WAD_FILEREF") containing unique file user/group data with other records and associated scripts. Other file associations and relationships may be used to store the metadata without departing from the scope of the present invention. (Step B)

After storing the metadata, the dispatch server 30 determines which of the files in the manifest need to be added to the file repository 33. In accordance with the exemplary embodiment of the present invention, the actual files of an application are stored in the file repository 33 under a file directory structure based on the file fingerprint (e.g., <sha1sum> value) of the associated file. For example, in accordance with an exemplary embodiment of the present invention as shown in FIG. 3, the first two characters of the <sha1sum> value of a file are used to create a directory for that file, and the name of the file is assigned as the <sha1sum> value. However, other directory schemes based on the file fingerprint value may be used without departing from the scope of the present invention. Once the upload manifest is received, the dispatch server 30 compares the file fingerprint included in the manifest for each file with the file fingerprints of the files already in the file repository 33. That is to say, if a file fingerprint (e.g., <sha1sum>, or <sha1sum>+<filesize>) in the manifest is found in the file repository 33, the file associated with the matched fingerprint will not be added to the file repository 33. Based on the fingerprints, the dispatch server 30 generates a list of files to be uploaded and sends the list back to the development server 20. (Step B)

Once the development server 20 receives the file upload list from the dispatch server 30, the transfer of the requested files from the dispatch server 30 is performed and stored in the file repository 33. (Step C) Accordingly, the application management framework in accordance with the present invention prevents duplicate files from being uploaded to the dispatch server 30 unnecessarily, thereby reducing the number of files stored in the file repository 33 and using the storage space more efficiently. Moreover, because the metadata of each file associated with the application is stored separately in the management database 35, any updated information for each file may be maintained even though the file associated thereto has not been modified.

Once the developed applications have been uploaded and queued in the dispatch server 30, the applications are dispatched to the various end devices on the network. It is to be understood that "dispatching" may be an install process (i.e., deployment) of the queued application or an uninstall process (i.e., undeployment) of the queued application. The application information designated for "dispatch" in the dispatch server 30 may be used to either install the designated application on the end devices or uninstall the designated application from the end devices. These end devices may be production server(s) 40 that run the applications for connected client device(s) 50. Alternatively, the dispatch server 30 may dispatch the queued application directly to client device(s) 60.

Figure 6A:
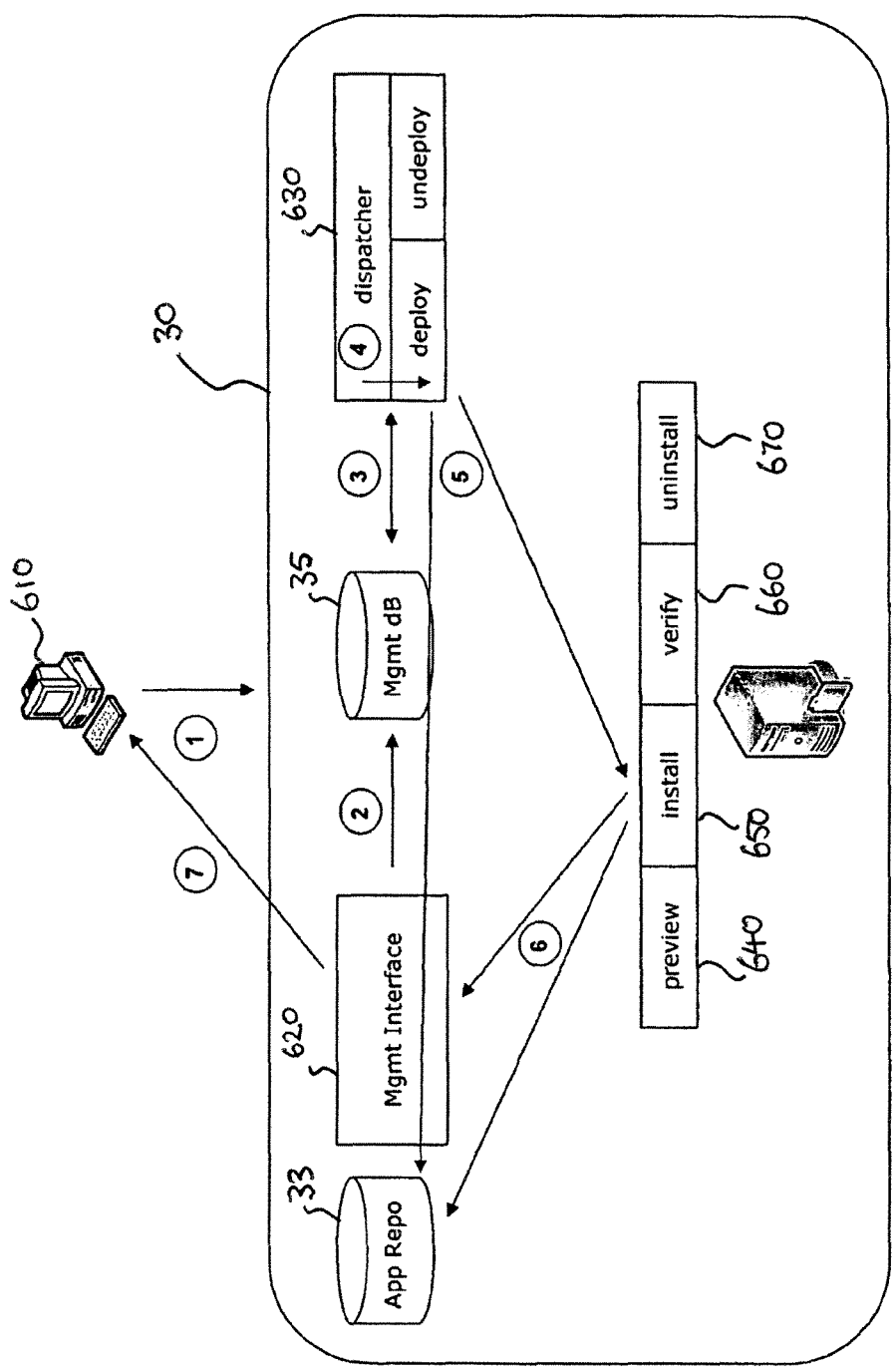
FIG. 6A illustrates a flow diagram of an exemplary dispatch process in accordance with the present invention.
Figure 6B:
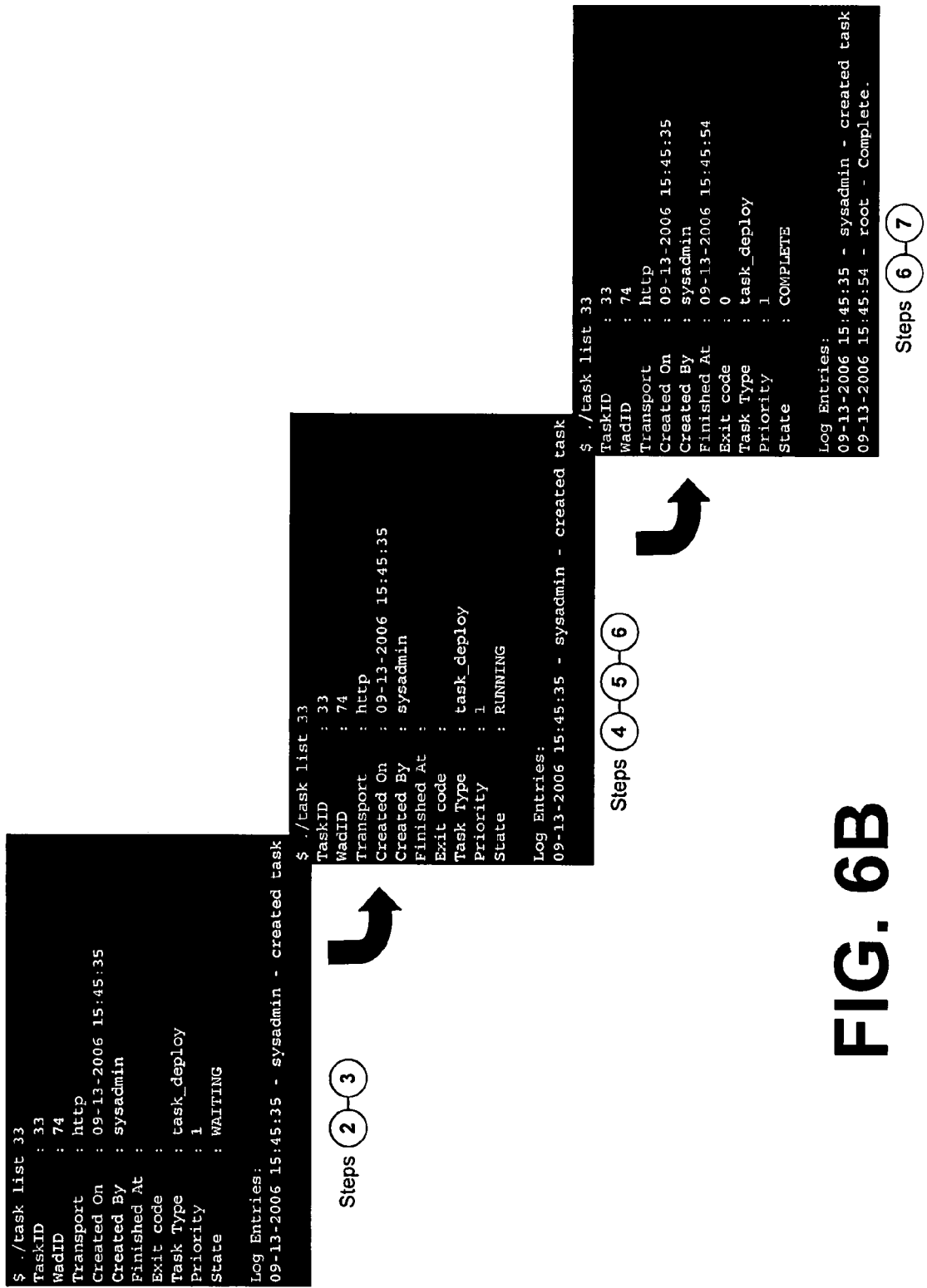
FIG. 6B illustrates exemplary screenshots displaying status of the dispatch process in accordance with the present invention.

The dispatch process of the applications by the dispatch server 30 will now be explained with reference to FIGS. 6A and 6B. An authorized user logs onto the dispatch server 30 through client device 610 to initiate a deployment (i.e., install) through the management interface module 620. (Step 1) An installation script is activated to create a task (i.e., job) in the management database 35 and updates a queue table in the management database 35. A task ID is created to allow the user to track the status of the job as shown in FIG. 6B. (Step 2) A dispatcher module 630 polls the queue table in the management database 35 and primarily serves to expire stale jobs in the queue table and to initiate installs/uninstalls. (Step 3) When the dispatcher module 630 finds a pending task in the queue table, the task is applied to a deploy script and updates the status of the take in the management database 35 as shown in FIG. 6B. (Step 4) The dispatcher module 630 checks the application repository 33 to determine if the files to be deployed are resident locally. If the files are not resident in the application repository 33, the dispatcher module 630 finds the location of the missing files from either the development server 20 or other dispatch servers 30 using the file fingerprint. When the file has been located, the file is fetched and cached locally in the application repository 33 in the manner described above, again, minimizing the creation of duplicate files needlessly. Once all the files have been located in the application repository 33, an install script 650 is initiated. (Step 5) The install script 650 executes any pre-installation instructions and then retrieves the application manifest. The manifest is compared with the locally resident files in the end device to determine if the files exist and/or the files are the same versions to be deployed (i.e., no modification has been made). The comparison is performed based on the file fingerprint as described above. If there are any discrepancies (i.e., the file is non-existent or is a different version), the correct files are located and retrieved. (Step 6) The install script 650 then deploys the files in the manifest and updates the status of the job as shown in FIG. 6B. (Step 7) During the deployment process, the user may query the status of the job through the management interface module 620. As shown in FIG. 7, the management interface module 620 may include a front ended load balancer to manage the load. All data locking operations may be managed by the management database 35 to allow for distributed management interfaces and distributed dispatchers. Undeployment (i.e., uninstall) process is executed in the same fashion as that of the deployment process described above with the exception that the uninstall script 670, when initiated, offloads the files in the manifest for the application that is being removed.

During the dispatch process, the dispatcher module 630 may invoke either or both a preview script 640 and a verify script 660. The preview script 640 notifies the user what is about to be performed and the verify script 660 notifies the user that has been performed. Furthermore, the exemplary embodiment of the present invention also includes logging features that store job status messages and log entries in the management database 35 for added debugging and monitoring features.

The application management framework in accordance with the present invention as described above provides many advantages. First, because only the changed or newly created files are uploaded to the dispatch server(s) from the application development team, unnecessary duplication of files are prevented, thereby utilizing network storage resources more efficiently. This becomes significant in large scale networks with multiple developers creating and modifying many applications. Second, because only the changed or newly created files are deployed to the end devices, again, the storage resources of the end device are utilized more efficiently. Moreover, because only the new or modified files are deployed, the installation time is reduced. Third, because the files and metadata are cached separately, multiple servers can be added for scalability. If a file requested by a client for installation is not found, a server can fetch the file from a source repository and cache it locally for deployment. Fourth, the application management framework in accordance with the present invention allows deployment of applications to virtual servers in clustered environments, such as network filesystem servers (NFS).

While specific examples have been used to describe the present invention, it will be apparent to those skilled in the art that various modifications and variations can be made in the system and method for application management of the present invention without departing from the spirit or scope of the invention. Thus, it is intended that the present invention cover the modifications and variations of this invention provided they come within the scope of the appended claims and their equivalents.

What is claimed is:

1. A method, comprising the steps of:
receiving a manifest, the manifest defining a computer application, the manifest including at least one file fingerprint unique to a computer file associated with the computer application, and metadata of the computer file;
checking for duplicates of the computer file on an end device by determining whether the computer file associated with the file fingerprint included in the manifest exists, using a computer; and
managing the computer application such that
(a) if the computer file associated with the file fingerprint does not exist on the end device, searching for the computer file on a device other than the computer, retrieving the computer file from the device and including the computer file associated with the file fingerprint for deployment with the computer application, or
(b) if the computer file associated with the file fingerprint exists on the end device, not including the computer file associated with the file fingerprint for deployment with the computer application,
wherein the steps of checking for duplicates and managing the computer application are performed on a file repository of a dispatch server, the file repository including a file directory structure based on the file fingerprint, the file repository only containing computer files having unique file fingerprints.

2. The method of claim 1, further including the step of adding the metadata included in the manifest to a database.

3. The method of claim 1, wherein the file fingerprint includes <sha1sum> value of the computer file, wherein the <sha1sum> value is based on a SHA-1 hash function.

4. The method of claim 3, wherein the file fingerprint further includes <filesize>value of the computer file.

5. The method of claim 1 further comprising the step of deploying the computer file associated with the computer application to an end device based on the file fingerprint.

6. The method of claim 1 further comprising the step of uninstalling the computer file associated with the computer application from an end device based on the manifest.

7. A computer program product including a non-transitory computer readable medium having stored thereon computer executable instructions that, when executed on a computer, configures the computer to perform a method comprising the steps of:
receiving a manifest, the manifest defining a computer application, the manifest including at least one file fingerprint unique to a computer file associated with the computer application, and metadata of the computer file;
checking for duplicates of the computer file on an end device by determining whether the computer file associated with the file fingerprint included in the manifest exists; and
managing the computer application such that
(a) if the computer file associated with the file fingerprint does not exist on the end device, searching for the computer file on a device other than the computer, retrieving the computer file from the device and including the computer file associated with the file fingerprint for deployment with the computer application, or
(b) if the computer file associated with the file fingerprint exists on the end device, not including the computer file associated with the file fingerprint for deployment with the computer application,
wherein the steps of checking for duplicates and managing the computer application are performed on a file repository of a dispatch server, the file repository including a file directory structure based on the file fingerprint, the file repository only containing computer files having unique file fingerprints.

8. The computer program product of claim 7, further including the step of adding the metadata included in the manifest to a database.

9. The computer program product of claim 7, wherein the file fingerprint includes <sha1sum> value of the computer file, wherein the <sha1sum> value is based on a SHA-1 hash function.

10. The computer program product of claim 9, wherein the file fingerprint further includes <filesize> value of the computer file.

11. The computer program product of claim 7 further comprising the step of deploying the computer file associated with the computer application to an end device based on the file fingerprint.

12. The computer program product of claim 7 further comprising the step of uninstalling the computer file associated with the computer application from an end device based on the manifest.

13. A system comprising:
memory operable to store at least one program; and
at least one processor communicatively coupled to the memory, in which the at least one program, when executed by the at least one processor on a computer, causes the at least one processor to:
receive a manifest, the manifest defining a computer application, the manifest including at least one file fingerprint unique to a computer file associated with the computer application, and metadata of the computer file;
check for duplicates of the computer file on an end device by determining whether the computer file associated with the file fingerprint included in the manifest exists; and
manage the computer application such that
(a) if the computer file associated with the file fingerprint does not exist on the end device, searching for the computer file on a device other than the computer, retrieving the computer file from the device and include the computer file associated with the file fingerprint for deployment with the computer application, or
(b) if the computer file associated with the file fingerprint exists on the end device, not include the computer file associated with the file fingerprint for deployment with the computer application,
wherein the steps of checking for duplicates and managing the computer application are performed on a file repository of a dispatch server, the file repository including a file directory structure based on the file fingerprint, the file repository only containing computer files having unique file fingerprints.

14. The system of claim 13, further comprising:
at least one developer device having at least one processor configured to create and/or modify at least one computer application to be deployed to an end device, the computer application defined by the manifest, the manifest including
(a) at least one file fingerprint unique to a computer file associated with the computer application, and
(b) metadata of the computer file; and
at least one dispatch server computer configured to manage deployment/undeployment of the computer application.

15. The system of claim 14, wherein the file fingerprint includes <sha1sum> value of the computer file, wherein the <sha1sum> value is based on a SHA-1 hash function.

16. The system of claim 15, wherein the file fingerprint further includes <filesize> value of the computer file.

17. The system according to claim 16, wherein the file fingerprint is the sum of the <sha1sum> value and the <filesize> value, wherein the <sha1sum> value is based on a SHA-1 hash function.

18. The system of claim 14, wherein the dispatch server includes a database to store the metadata of the computer file included in the manifest.

19. The system of claim 14, wherein the dispatch server includes a dispatch module to deploy the computer file associated with the computer application to the end device based on the file fingerprint.

20. The system of claim 14, wherein the dispatch server includes an undeployment module to uninstall the computer file associated with the computer application from the end device based on the manifest.

21. The system of claim 14, wherein the end device includes at least one of a server or a client device.

* * * * *